United States Patent [19]
Lobur

[11] 3,749,877
[45] July 31, 1973

[54] ELECTRICAL ARC DETECTOR

[75] Inventor: Walter Lobur, Clawson, Mich.

[73] Assignee: Electronic Removal of Metals, Inc., Clawson, Mich.

[22] Filed: Jan. 11, 1972

[21] Appl. No.: 217,011

[52] U.S. Cl. .............................. 219/69 S, 219/69 C
[51] Int. Cl. ............................................. B23p 1/08
[58] Field of Search ................ 219/69 C, 69 S, 69 G

[56] References Cited
UNITED STATES PATENTS
| | | | |
|---|---|---|---|
| 2,769,078 | 10/1956 | Matulaitis | 219/69 S |
| 3,311,782 | 3/1967 | Smith et al. | 219/69 C X |
| 3,548,142 | 12/1970 | Sennowitz | 219/69 C |
| 3,609,281 | 9/1971 | Kauffman | 219/69 S X |

Primary Examiner—R. F. Staubly
Attorney—Irving M. Weiner

[57] ABSTRACT

An electrical discharge machining circuit for sensing the failure of the arc current to extinguish between power pulses due to a direct current component in the arc current. The direct current component may be caused by leaky or shorted output transistors, by excess arc inductance for the power pulse duty factor, drive failure, or other causes. The direct current component causes "arc-out" damage to the workpiece and to the tool electrode. The circuit depends upon the drop-out point of a relay when the arc current duty factor approaches or includes a direct current component which component is used to oppose or cancel the relay holding current.

10 Claims, 2 Drawing Figures

ELECTRICAL ARC DETECTOR

The present invention relates to an electrical arc detector circuit, and in particular relates to a direct current arc detector circuit which is especially suited for use in conjunction with electrical discharge machining equipment.

BACKGROUND OF THE INVENTION

In a normal conventional electrical discharge machining operation, the tool electrode is advanced by a servomechanism toward the workpiece until a voltage breakdown occurs to create a local spark, or an electrical arc of a short duration, to erode away the high spots of the workpiece material. When the power pulse is turned OFF, then the arc goes OUT. The next power pulse should re-strike a new highspot as determined by the conductivity of the decomposed electrolyte the random alignment of the debris, the flow path of the flushing electrolyte and other factors. In this servomechanism-control established arc gap condition, the successive sparks or discharges are always moving to strike a new high area of the workpiece.

When the power pulse is turned OFF, the current may continue to flow because of the "fly-back" of the energy stored in the inductance of the tool electrode and workpiece arc cable lead lengths. The current will continue to flow until the stored energy is dissipated. If the power pulse duty factor is too high, or the OFF time between power pulses is too short, to permit the inductance to discharge, the arc will not deionize and extinguish. The next succeeding power pulse will "re-strike" the same still ionized spot, instead of moving or roving to a new high area of the workpiece. A direct current component due to leaky or shorted output transistors, or a defect in the drive circuits could cause the same effect. This effect or phenomenon called "direct current arc" or "arc-out" concentrates heat upon one spot causing severe melt damage to the workpiece and to the tool electrode. In the case of a graphite electrode, the intense local heat will change the constitution of the graphite into a high resistance porous structure which will heat very easily from the passage of current and consequently hinder de-ionization to further promote the "direct current arc" condition. The present invention solves the disadvantageous condition mentioned above, and has led to the development of circuits which sense this condition and automatically turn OFF the electrical discharge machining power.

SUMMARY OF THE INVENTION

The present invention provides a circuit especially adapted for use in an apparatus for machining a conductive workpiece by means of electrical discharges across a gap between a tool electrode and the conductive workpiece. The apparatus includes a source of machining power, and an electronic control device having a control electrode and a pair of power electrodes. The power electrodes are connected between the source of machining power and the gap between the conductive workpiece and the tool electrode for providing electrical machining pulses thereto. A drive signal means is connected to the control electrode of the electronic control device for rendering the electronic control device alternately conductive and non-conductive. The improvement comprises a sensing means for sensing failure of extinguishment of arc current through a series resistance when the electronic control device has been rendered non-conductive. Control means are operatively connected to the sensing means for de-energizing the source of machining power when the failure of extinguishment of the arc current is sensed by the sensing means.

It is an object of the present invention to employ a relay having a DC holding current which is responsive to ON-OFF ratio or duty factor of a square wave power pulse with an opposing voltage derived as a function of the arc current. The pertinent condition in the circuit is the ratio of the relay voltage to the relay drop-out voltage.

It is another object of the present invention to provide a circuit wherein the error signal is a function of the arc current that is derived from the voltage drop across a dropping resistor which is connected in series with the arc loop.

Another object of the present invention is the employment of a fail-light indicator which is used in conjunction with the novel circuit mentioned above.

Another object of the present invention is to provide for the faithful transfer of the error signal or condition to a different direct current level within the total power supply circuit.

DETAILED DESCRIPTION OF THE INVENTION

Figure 1:
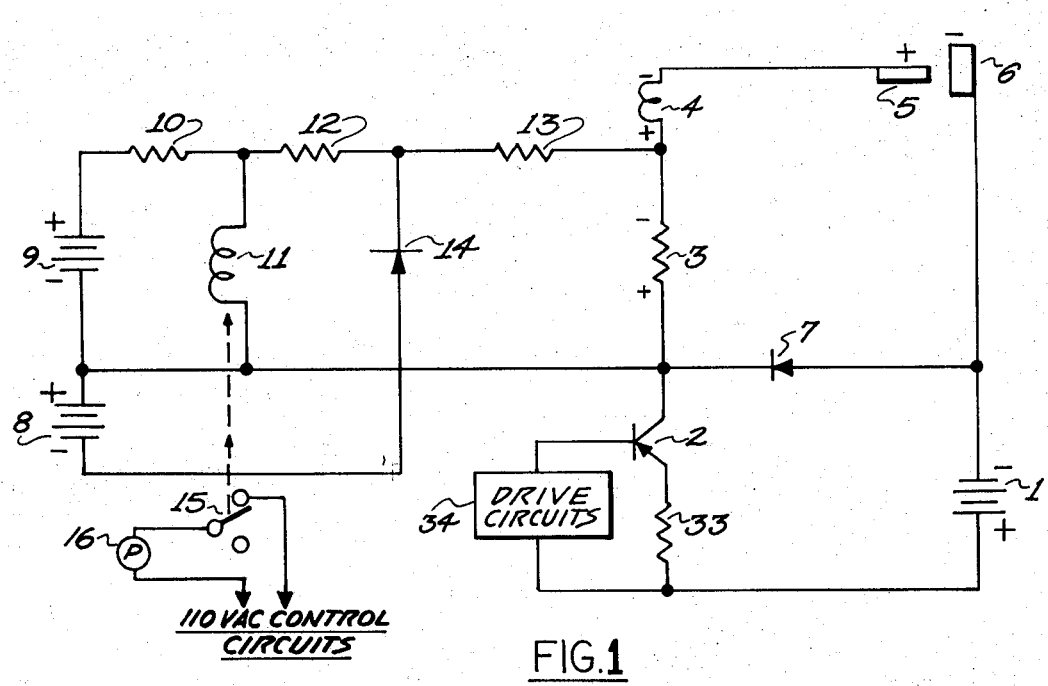
FIG. 1 illustrates a schematic diagram of a circuit according to a first embodiment of the present invention wherein the direct current supplies are "floating".

The term "electronic control device" as used herein is intended to mean any electronic switching device having three or more electrodes comprising at least two principal power electrodes acting to control current flow in the power circuit, the conductivity between the power electrodes being controlled by a control electrode within the device whereby the conductivity of the power circuit is controlled statically or electrically without the movement of mechanical elements within the device. Included within this definition are vacuum tubes, transistors, and other solid-state devices in which the turn-ON is accomplished by a control voltage applied to the control electrode and in which the turn-OFF is accomplished automatically in response to the removal of that control voltage.

In the drawings, the direct current supplies have been illustrated as batteries in the interest of simplifying the drawings and the description thereof. In actual practice, these sources of direct current may be derived from the secondary of a transformer having its primary connected to the power source for the electrical discharge machining apparatus which may be single phase or polyphase alternating current. The secondary voltage may be rectified and stored, usually in an electrolytic storage capacitor to form a nearly ideal direct current source having a very low internal impedance.

With reference to FIG. 1 of the drawings, the source of machining power or the direct current supply 1 supplies electrical discharge machining power to the system. The electronic control device 2, the resistor 33 and the drive circuit 34 represent solid-state output circuits and their associated drive circuits capable of square wave switching with variable frequency, variable pulse width, and variable duty factor. Sensing means, including dropping resistor 3, is operatively connected to the arc gap between the conductive workpiece 6 and the tool electrode 5. The dropping resistor 3 limits the current to that desired at the arc gap, and insures that such current will not exceed the safe limit of the electronic control device or transistor 2.

The inductance 4 represents the lumped inductance of the tool electrode 5 and the workpiece 6 arc cable lead lengths. The diode 7 protects the electronic control device 2 from inductive spike voltage damage.

In conventional electrical dischage machining apparatus, when the power pulse is turned OFF by the electronic control device 2, the current will continue to flow due to "fly-back" of the energy stored in the inductance 4. The current flow will be in the same direction through the dropping resistor 3, the diode 7, and the gap between the conductive workpiece 6 and the tool electrode 5, and will continue to flow until the energy stored in the inductance 4 has been dissipated. If the power pulse duty factor is too high, or the OFF time between pulses is too short, to permit the inductance 4 to discharge, the arc will not deionize and extinguish. The succeeding power pulse will "re-strike" the same still ionized spot, instead of moving or roving to a new high area on the conductive workpiece 6.

A direct current component due to leaky or shorted transistors in the output circuit, or a defect in the drive circuits could cause the same effect or condition. This condition or phenomenon called "DC arc" or "arc-out" concentrates heat upon one spot causing severe melt damage to the conductive workpiece and to the tool electrode. In the case of graphite electrodes, the intense local heat will change the constitution of the graphite into a high resistance porous structure which heats very easily from the passage of electrical current and thereby hinders the de-ionization to further promote the "DC arc" condition. This undesirable condition has led to the development of the circuit of the present invention which senses this condition and thereupon turns OFF the cutting power.

In FIG. 1, the floating direct current supply 9 through resistor 10 energizes the relay coil 11 to close relay contacts 15. The closing of the relay contacts 15 permits the energizing of contactor 16 which is in the alternating current lines which provides the main cutting power to direct current supply 1. The arc current drop across dropping resistor 3 is of the polarity shown in the drawing, and the voltage drop across resistor 3 is applied to the terminals of relay coil 11 in opposition to the voltage applied across relay coil 11 by the floating direct current supply 9. The voltage across dropping resistor 3 is applied through resistor 13 and clipped by the diode 14 to the voltage of floating direct current supply 8 which is exactly equal and opposite to that of the floating direct current supply 9. This clipped voltage is applied through resistor 12 to the relay coil 11, and the circuit is completed to the common line of the floating direct current supplies 8 and 9 and the dropping resistor 3. The value of the resistor 10 is equal to the value of the resistor 12.

In the above-described manner, voltages of substantially equal magnitude from sources of substantially equal regulation, but of opposing polarity are obtained. In this connection it should be noted that the values of resistors 10 and 12 are equal, and that resistor 13 is chosen to pass more than the required magnitude of current. If both voltages applied across the relay coil 11 were direct current voltages, such as through resistor 10, the imposed voltage across the relay coil 11 would be zero, and the relay coil 11 would drop out or de-energize. However, the voltages imposed across the dropping resistor 3 are rectangular square wave pulses, and only when the duty factor is well over 90 percent, or there is a direct current component, will the voltage across the relay coil 11 approach the drop-out point.

Typical values of the components for a preferred embodiment according to the system illustrated in FIG. 1 may be helpful at this point. When the main direct current supply 1 is 80 volts, the typical arc gap drop is 25 to 30 volts, leaving 50 to 55 volts across the dropping resistor 3. When the floating direct current supplies 8 and 9 are 20 volts and the relay coil 11 is 1,000 ohms rated at 15 volts at 15 milliamperes with a drop-out voltage typically at 1.2 volts, it can be seen that a direct current component causing a 20 volt drop across the dropping resistor 3 would result in the de-energizing of the relay coil 11. Moreover, the duty factor including inductive current effects exceeding a certain ratio of ON to OFF duration would also cause drop-out of the relay coil 11. It is also known that a volt meter or coil will respond to the average duty factor, e.g., at 50 percent duty factor a volt meter would read one half the square wave peak amplitude. The ratio of dropout voltage to the applied voltage taken as 1.2/15 equals 7.5 percent, or 100 minus 7.5 equals 92.5 percent duty factor of the opposing voltage would cause drop-out voltage "cross-over" to appear across the relay coil 11 to turn OFF the main machining direct current power source 1.

The embodiment of the invention illustrated in FIG. 1 is an operable working circuit, but it requires the floating direct current supplies 8 and 9. In order to make use of existing direct current supplies, the second embodiment illustrated in FIG. 2 was developed which still embodies the concepts of the FIG. 1 system.

Figure 2:
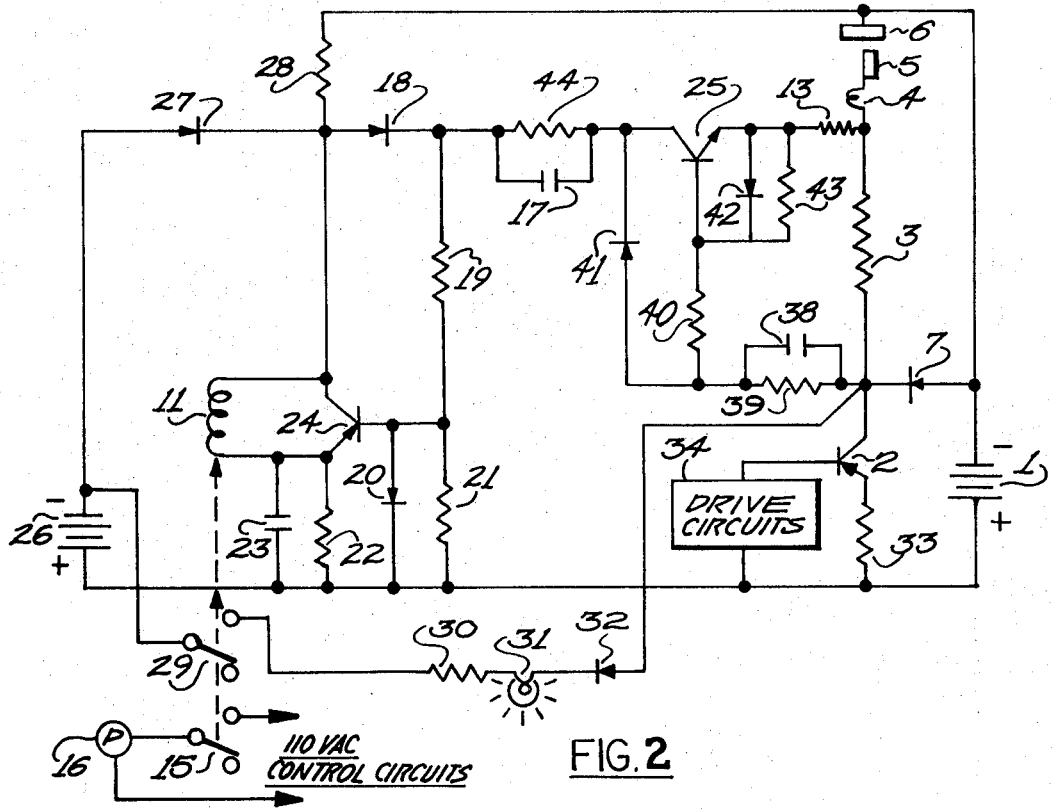
FIG. 2 illustrates a schematic diagram of a second embodiment according to the principles of the present invention.

With reference to FIG. 2, the control means connected to the sensing means includes transistors 24 and 25 and their associating components. The transistor 25 faithfully transfers the signal voltage drop from across dropping resistor 3 to the transistor 24 which in turn shorts the relay coil 11 in response to the signal until the signal properties are such as to cause the relay coil 11 to drop-out similar to the FIG. 1 embodiment. There is also provided fail light 31 which acts as an ohmic indicator to aid in locating and/or ascertaining a shorted output transistor, such as transistor 2, and aids in other trouble-shooting.

With respect to the FIG. 2 embodiment, the description of all the components which also appear in the FIG. 1 embodiment will not be repeated in the interest of brevity. The error signal developed across the dropping resistor 3 is applied through the dropping resistor 39 and the condenser 38 to preserve the steep rise and fall of the square wave signal and is clipped by diode 41 to prevent over-drive saturation storage time. The signal is applied through resistor 40 to the base of transistor 25 and returns through resistor 13 to the signal source sensing resistor 3. Diode 42 protects the base-emitter junction of transistor 25 from reverse voltage, and resistor 43 aids in turn-off.

The collector output of transistor 25 is fed through the dropping resistor 44 and the peaking condensor 17 to drive clip diode 18, and through resistor 19 to the base of the transistor 24. The diode 20 protects the base of the transistor 24 from excess reverse voltage, while resistor 21 is the bias return.

The relay coil current is taken from the main direct current supply 1 through resistor 28, and is clipped by diode 27 to 18 volt direct current supply 26. The circuit is then only operative when the main cutting power or DC supply 1 has been energized by cycle start control circuits, and relay contacts 15 are part of the self-hold circuit. Additional voltage is dropped across resistor 22 and condenser 23 by the relay coil current, and because the resistor 22 and the condenser 23 are connected to the emitter electrode of the transistor 24, they form a bias voltage so that only a valid square wave signal is fed through.

When the transistor 24 is conducting in response to the signal transferred from the dropping resistor 3 of such duty factor or direct current component, the relay coil 11 will drop-out to turn OFF the main cutting power to direct current supply 1 as in the FIG. 1 embodiment. When the relay coil 11 is de-energized, a second set of contacts 29 completes the light indicator circuit with power being taken from the direct current supply 26 through dropping resistor 30, through ohmic fail light bulb 31, through blocking diode 32, to complete a circuit across the output transistor 2. A shorted transistor, a failure in the protection circuits, etc., will cause the light 31 to glow and act as a trouble indicator and as an aid in isolating trouble in the circuit.

I claim:

1. In an apparatus for machining a conductive workpiece by means of electrical discharges across a gap between said conductive workpiece and a tool electrode, including
    a source of machining power,
    an electronic control device having a control electrode and a pair of power electrodes,
    said power electrodes being connected between said source of machining power and said gap between the conductive workpiece and the tool electrode for providing electrical machining pulses thereto, and
    a drive signal means connected to said control electrode of said electronic control device for rendering said electronic control device alternately conductive and non-conductive,
    wherein the improvement comprises:
    current-sensing means operatively connected to said gap between said conductive workpiece and said tool electrode for sensing failure of extinguishment of arc current across said gap only when said electronic control device has been rendered non-conductive; and
    control means operatively connected to said sensing means for de-energizing said source of machining power when said failure of extinguishment of said arc current is sensed by said sensing means.

2. The combination according to claim 1, wherein an electrical component is connected between said source of machining power and one of said power electrodes of said electronic control device, said electrical component having a substantially low impedance to the flow of electrons in a predetermined direction and having a substantially high impedance to the flow of electrons in a direction opposite to said predetermined direction.

3. The combination according to claim 1, wherein said control means includes the coil of a relay having its contacts operatively connected to and controlling the output from said source of machining power.

4. The combination according to claim 2, including
    a second electronic control device connected in parallel with the coil of said relay;
    said sensing means includes a dropping resistor connected in series with the arc loop containing said gap between said conductive piece and said tool electrode;
    a third electronic control device operatively connected to said sensing means and said second electronic control device for faithfully transferring the voltage drop appearing across said resistor to said second electronic control device.

5. The combination according to claim 2, wherein said sensing means includes an impedance element connected in series with said source of machining power, said electronic control device, and said gap between the conductive workpiece and the tool electrode;
    wherein the de-energization of said source of machining power depends upon the drop-out point of said relay coil when said arc current includes a direct current component which component is utilized to oppose the relay holding current.

6. The combination according to claim 1, wherein said sensing means includes an impedance element which forms part of a series circuit with said source of machining power, said electronic control device, said conductive workpiece, and said tool electrode.

7. The combination according to claim 9, wherein:
    said drive signal means is connected between one terminal of said source of machining power and said control electrode of said electronic control device;
    said electronic control device constituting the output transistor for the electrical discharge machining apparatus;
    one of said power electrodes of said output transistor being directly connected to one terminal of said impedance element, and
    said control means de-energizes said source of machining power when the non-conductive periods of said electronic control device are much shorter than the conductive periods of said electronic control device.

8. The combination according to claim 1, wherein said control means includes a relay coil having its contacts operatively connected to and controlling the output from said source of machining power;
    and including a source of direct current which is operatively connected to said relay coil and to one of said power electrodes of said electronic control device.

9. The combination according to claim 4, wherein said sensing means includes a dropping resistor connected in series with the arc loop which includes said gap between said conductive workpiece and said tool electrode, and
    said relay coil has a DC holding current which is responsive to ON-OFF ratio or duty factor of a square wave pulse that is opposed by a voltage derived as a function of said arc current.

10. A combination according to claim 4, including a fail-light ohmic indicator forming part of a circuit connected between said electronic control device and said source of direct current.

* * * * *